United States Patent [19]

Siler

[11] Patent Number: 4,935,083

[45] Date of Patent: * Jun. 19, 1990

[54] PROCESS FOR PRODUCING DESIGN PATTERNS ON MATERIALS

[76] Inventor: Todd L. Siler, 1010 Massachusetts Ave., Cambridge, Mass. 02138

[ * ] Notice: The portion of the term of this patent subsequent to Aug. 30, 2005 has been disclaimed.

[21] Appl. No.: 231,227

[22] Filed: Sep. 21, 1988

[51] Int. Cl.$^5$ .......................... B29C 59/00; D06P 7/00
[52] U.S. Cl. ........................................ 156/219; 8/484; 8/486; 8/497; 34/16; 156/277; 156/308.4; 264/40.1; 264/78; 264/131; 264/132; 264/136; 264/293; 427/198; 427/272; 427/276
[58] Field of Search .................... 264/40.1, 73, 74, 77, 264/78, 131, 132, 134, 136, 245, 246, 247, 293; 156/64, 219, 277, 308.4; 427/197, 198, 271, 272, 275, 276, 280, 282, 288, 421; 8/483, 484, 486, 487, 497, 498; 34/16

[56] References Cited

U.S. PATENT DOCUMENTS

| | | | |
|---|---|---|---|
| 2,661,543 | 12/1953 | Tyndall et al. | 34/16 X |
| 3,378,935 | 4/1968 | Augere | 34/16 X |
| 3,432,376 | 3/1969 | Reed et al. | 156/234 |
| 3,502,495 | 3/1970 | Akamatsu | 8/497 X |
| 3,519,466 | 7/1970 | Akamatsu | 264/78 X |
| 3,523,152 | 8/1970 | Curtis | 264/246 |
| 3,619,866 | 11/1971 | Hofmann et al. | 425/3 |
| 3,696,780 | 10/1972 | Fritzsche | 118/301 X |
| 3,791,864 | 2/1974 | Steingroever | 427/47 |
| 3,865,540 | 2/1975 | Loeffler | 34/16 X |
| 3,867,299 | 2/1975 | Rohatgi | 425/3 X |
| 3,925,905 | 12/1975 | Zeiffer | 34/16 |
| 3,941,636 | 3/1976 | Drout et al. | 264/132 X |
| 3,953,654 | 4/1976 | Weidman | 264/78 |
| 3,986,274 | 10/1976 | Holm | 34/16 X |
| 4,033,153 | 7/1977 | Ahrweiler et al. | 68/205 R |
| 4,157,938 | 6/1979 | Clemens et al. | 34/16 X |
| 4,202,188 | 5/1980 | Gruber | 68/205 R |
| 4,297,099 | 10/1981 | Simon et al. | 8/484 |
| 4,388,137 | 6/1983 | McCarty et al. | 156/234 X |
| 4,438,570 | 3/1984 | Dokoupil | 34/16 X |
| 4,454,179 | 6/1984 | Bennett et al. | 156/234 X |
| 4,547,410 | 10/1985 | Panush et al. | 427/421 X |
| 4,576,020 | 3/1986 | Thurman et al. | 68/205 R |

FOREIGN PATENT DOCUMENTS

| | | | |
|---|---|---|---|
| 1006671 | 3/1977 | Canada | 264/247 |
| 3006604 | 8/1981 | Fed. Rep. of Germany | 264/22 |
| 3123102 | 12/1982 | Fed. Rep. of Germany | 8/484 |
| 53-41590 | 4/1978 | Japan | 8/486 |
| 53-149256 | 12/1978 | Japan | 264/132 |
| 55-49230 | 4/1980 | Japan | 264/132 |
| 1222744 | 2/1971 | United Kingdom | 427/197 |

OTHER PUBLICATIONS

Webster's New Collegiate Dictionary, G & C Merriam Co., 1981, p. 596.

Primary Examiner—Jeffery Thurlow
Assistant Examiner—Leo B. Tentoni

[57] ABSTRACT

A process for providing a design patterns in a material wherein a selected medium is applied to the material, the material being positioned adjacent a surface of a template which surface has selected surface characteristics either topographical or non-topographical in nature. The material is held against the template surface at a selected pressure and for a selected time period, at least a portion of the medium coming into contact with the template surface, the adhesive and conesive forces of the material, the medium, and the template interacting with each other to generate a unique design relief pattern on the surface of the material which pattern differs from the pattern characteristics of the template. The material is then suitably dried. The viscosity and amount of the medium, as well as the pressure used, are selected to lie within specified ranges to produce heavy or light relief patterns on permeable or non-permeable materials.

33 Claims, 5 Drawing Sheets

PROCESS FOR PRODUCING DESIGN PATTERNS ON MATERIALS

INTRODUCTION

This invention relates generally to processes for producing design patterns on materials and, more particularly, to a unique process for producing such design patterns using the surface characteristic of a template for interacting with such material and a medium applied thereto for a selected time period.

BACKGROUND OF THE INVENTION

The use of design patterns particularly on the surfaces of various materials, such as textiles, paper, and the like, has been achieved using various techniques over the centuries.

For example, one of the oldest methods of applying surface designs is the use of resist printing, early Japanese batiks and Japanese stencil prints being examples thereof as well as plangi tie-dye techniques developed in Asia. Such techniques normally use an appropriate device to protect certain areas of the material so as to prevent penetration in such areas, as from a dye. Other similar printing techniques have been developed such as stencil printing, screen printing, transfer printing and the like. Further the application of yarns and threads as a method of decorating fabrics has long been used as in the field of embroidery and tapestry, for example. Moreover, mechanical techniques such as embossing have also been used over the years. While those in the art have attempted to use the above well known techniques to produce different and dramatic design patterns and effects, the art is continually looking for ways of achieving further novel effects, particularly in the highly competitive field of fabric designs, (textile industry) and home furnishings as well as in the paper products industry.

SUMMARY OF THE INVENTION

This invention can be used to provide noteworthy, imaginative and unique design patterns on various materials, such as metals, fabrics, paper, leather, wood, plastics, or other materials, in a manner which is novel to the art. In accordance therewith the material on which a design pattern is to be produced is positioned adjacent a surface of a template, the template having selected surface characteristics. The material is held against the template surface for a selected time period using a selected pressure which may be externally applied thereto or which may merely be due to the weight of the material itself. A medium such as an ink, dye or a paint, for example, is applied to selective portions of the exposed surface of the material and at least a portion of the medium is permitted to penetrate through the material to the surface which is adjacent the template surface. In such process the surface characteristics of the template interact with the material as the medium is being applied thereto and produces a design pattern in the material. If the medium is a wet medium, the material can then be dried, either by using natural air drying or by applying heat thereto, and the dried material can then be removed from the template.

Materials using such process have produced striking design pattern effects which provide an appearance quite unlike that achieved by known prior art processes.

DESCRIPTION OF THE DRAWINGS

The invention can be described in more detail with the help of the accompanying drawings wherein.

DESCRIPTION OF THE PREFERRED EMBODIMENTS

Figure 1:
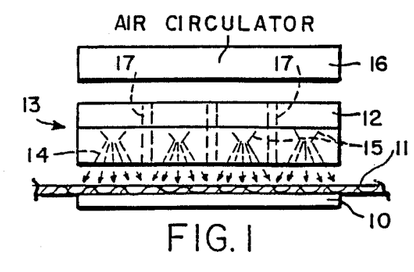
FIG. 1 shows a diagrammatic view of an embodiment of a device for practicing the process of the invention depicted at one stage of the process.
Figure 2:
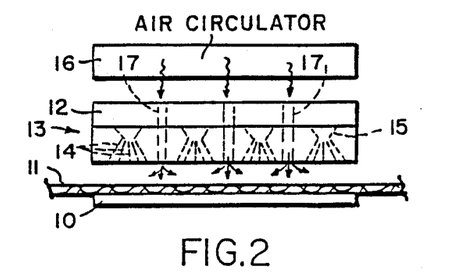
FIG. 2 shows the embodiment of FIG. 1 depicted at another stage of the process.
Figure 3:
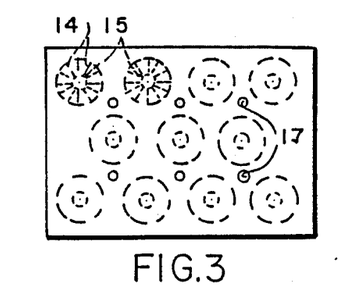
FIG. 3 shows a plan view of a portion of the embodiment of FIGS. 1 and 2 for applying the medium and for providing heat, if desired.
Figure 4:
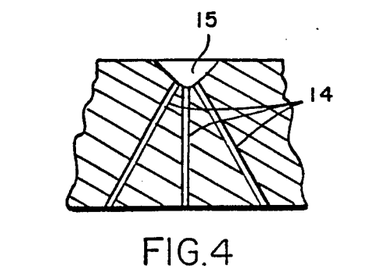
FIG. 4 shows a more detailed cross-sectional view of a portion of an exemplary manner for applying the medium in the embodiment of FIG. 1.

As can be seen in FIG. 1 the process of the invention can be illustrated most clearly using a simplified diagrammatic representation of a device for performing the process. Such an apparatus utilizes a substrate or template 10 on which is positioned a material 11 such as a fabric or textile material on which a design pattern is to be created. Such design pattern can be either random or non-random in nature and, if non-random, such pattern can be either abstract or representational. A reservoir 12 containing a suitable medium, such as a dye, an ink or a paint medium, can be applied to the exposed surface of material 11 opposite the surface adjacent template 10 via a suitable application means 13 which may include a plurality of channels 14, depicted more clearly in FIG. 4, which are supplied from the main reservoir 12 through individual reservoir cups 15 associated with each of the plurality of channels 14. In embodiments where the medium is a wet medium and it is desired that the finished product be dried reasonably quickly a suitable air circulator 16 can be used to apply either heated or unheated air to the material 11 via a plurality of channels 17 appropriately placed in the reservoir means 12 between the various media application channels, as shown in FIGS. 2 and 3.

In accordance with a preferred embodiment of the process of the invention the material 11 is positioned adjacent a surface of a template 10 as depicted in FIG. 1. Such material can be held against the template surface for a selected time period at a selectable pressure which can be either the pressure provided by the weight of the material itself or a controllable pressure which can be supplied externally in an appropriate manner. For example, in the particular embodiment shown in FIG. 1 air at a controllable pressure can be utilized from air circulator 16 so as to supply heated or unheated air under pressure through channels 17, the air then impinging upon the material at such a controllable pressure as to hold the material against the template 10 with a desired force. Other techniques for providing a controllable pressure as to hold the material against the template at a desired pressure can also be devised by those in the art. As discussed below, the amount of pressure used to hold the material against the template is an important parameter in affecting the variations in the design patterns which can be achieved. In addition, the time period which is selected is also an important parameter in affecting the variations in the design patterns which can be achieved.

While the material is being held against the surface of the template under the desired selectable pressure, a medium is applied to selected portions of the exposed surface of material 11 via selectively activated channels 14. Not all of the channels need be used and certain channel assemblies or certain channels within one or more of such assemblies can be selected for use in accordance with the process of the invention so as to create various design pattern effects.

At least portions of the medium which is applied to the exposed surface of material 11 are premitted to penetrate through the material to the opposite surface thereof which is adjacent template 10. Template 10 is provided with selectable surface characteristics, as discussed in more detail below. In accordance with such process it is found that the interaction of the selected surface characteristics of template 10 with the material held against the template surface for a selected time period under pressure as the medium is being applied thereto produces a striking and impressive design pattern effect on the surface of the material which is adjacent the template. Different pattern effects can be achieved using different material substrates, different template surface characteristics, different pressures of the material against the template, different time periods, and different media e.g. different types of either wet or dry media.

If the medium which is used is a wet medium, before removing material 11 from the surface of template 10, the material containing the medium which has been applied thereto is permitted to dry. Such drying process can be achieved by using a naturally circulating air current drying process, or an air circulator 16 can be utilized to apply heated or unheated air under pressure to the material 11 so as to dry it more quickly, as depicted in FIG. 2. Once the material is dry it can be removed from the surface of the template. Upon removal it is found that the surface that had been adjacent the template during the process now has a desired design pattern.

It should also be pointed out that once the material is dry, or even at any earlier point in the overall process, e.g., after the medium has been applied and before drying, it is possible to re-work the pattern that has been placed thereon by substituting a template having different surface characteristics, or a template having a smooth flat surface, and varying the media or pressures involved to create a further pattern which is superimposed upon or blended with the original pattern that has already been created. Accordingly, the original pattern can be suitably enhanced or further changed as desired either after the process has been completed or at some point during the process. For example, the original pattern can be built up (as in a low or shallow relief) to achieve a layered design pattern effect.

Details of a specific apparatus for performing the various steps of the design pattern producing process would be well within the skill of the art. For example, the design of media applicators and the use of heat sources for drying materials is well known to the art. It would also be within the skill of those in the art to provide an apparatus which permits the insertion and positioning of the material 11 against a template surface. Various techniques for holding the material against the template at a controllable pressure can also be devised by those in the art.

Figure 5:
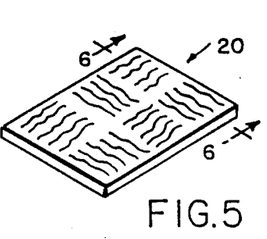
FIG. 5 shows an isometric view of a template used in the process of the invention.
Figure 6:
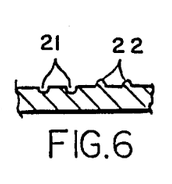
FIG. 6 shows a view in cross-section of a portion of the template of FIG. 5 along the line 6—6.
Figure 7:
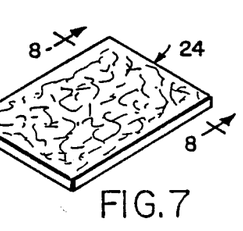
FIG. 7 shows an isometric view of another embodiment of a template used in the process of the invention.
Figure 8:
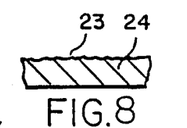
FIG. 8 shows a view in cross-section of a portion of the template of FIG. 7 along the line 8—8.

As can be perceived from the above description, the surface characteristics of the template represent a critical parameter in determining the design pattern that is obtained. Exemplary surface patterns are discussed below with reference to FIGS. 5–10. In FIG. 5, for example, a template 20 may have a surface thereof formed in a topographical pattern. Such pattern may be in the form of a regularized pattern as depicted, which pattern is formed utilizing a plurality of grooves 21 and protrusions 22 as shown more clearly in FIG. 6. Such a topographical pattern may also be formed in a random fashion utilizing an appropriate device for producing random indentations 23 in the surface of template 24 as shown in FIGS. 7 and 8. Further, such topographical patterns may be in a purposely designed artistic form which can be either abstract or representational in nature or combinations of both random or non-random patterns can be created by using different templates in succession as described above.

Figure 9:
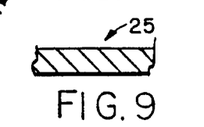
FIG. 9 shows a view in cross-section of another embodiment of a template having a different surface characteristic.

In some cases it may be desirable to use a non-topographical template surface characteristics such as shown by the template 25 of FIG. 9. It has been found that an appropriate plastic material, such as a clear polyethylene or a vinyl material, having a smooth surface can be used for the template. When the process is carried out, the interaction of the non-topographical surface characteristic of such a template with the material having the wet medium applied thereto tends to cause portions of the template surface to be removed when the material itself is removed therefrom, portions of such plastic template thereby being permanently bonded to the adjacent surface of the material on which the design pattern is to be formed. When the material is fully removed from contact with the template surface, imaginative and effective design patterns result from the presence of such permanently bonded portions. In such cases, the particular design pattern may not necessarily be predictable by the user but it has been found that many impressive and vivid design effects can be achieved using a suitable plastic material having smooth, or non-topographical, characteristics and being capable of such bonding operation. As discussed above, further or additional printing processes, i.e. using conventional techniques, can be applied to a design completed in accordance with the invention, thereby creating another different design made by using a combination of the techniques of the invention and conventional techniques.

Figure 10:
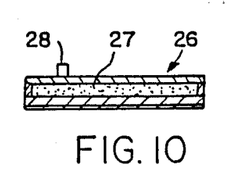
FIG. 10 shows a template utilizing magnetizable particles in its interior for providing selected surface characteristics thereof by computerized manipulation of the particles.
Figure 11:
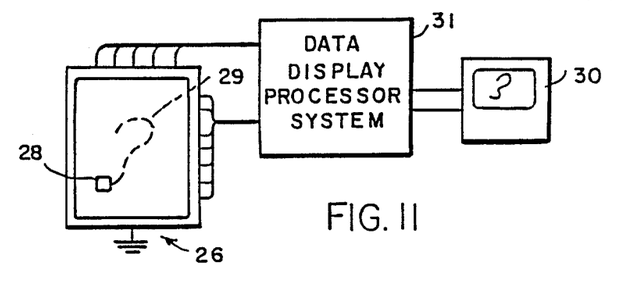
FIG. 11 shows a block diagram of an overall data processing system for use with the template of FIG. 10.

A further alternative embodiment for providing an effective design pattern is depicted in the template substrate 26 of FIG. 10. In such an embodiment a plastic or non-magnetizable material is utilized for the substrate itself and the interior 27 thereof is hollow. Magnetizable elements in the form of a magnetized filler material are placed within the interior 27 of the substrate. As shown in FIG. 11 a selected pattern of such magnetizable elements may be formed in the interior of template 26 by moving a magnet 28 over the surface thereof along a line which forms a desired pattern configuration, such as depicted by dashed line 29. The movement of the magnet causes the filler material to be aligned with such design pattern within the interior of template 26. The designer can display in real time, as he or she is creating the design, the pattern which is being formed on a suitable monitor screen 30 (e.g. a cathode ray tube) using a suitable data display processor system 31. For example, it would be well known in the display art to utilize an appropriate grid wire matrix, position sensing structure in association with the template for supplying data to the data display processor system which represents the position of the magnet as it is being moved on the surface of the tample. Such data can then be suitably processed so as to be displayed on screen 30 as shown. As mentioned above with respect to physically formed topographical template surfaces, the magnetic elements may be formed in random or non-random patterns, and, if non-random, may be arranged to produce either an abstract or a representational design pattern.

Once the magnetizable filler elements are arranged in a particular pattern within the substrate 26, a magnetized medium, which can be appropriately magnetized in accordance with well known techniques, is applied to the surface of the material 11. The medium is attracted to those regions of the substrate under which the desired pattern of magnetizable elements has been formed.

Moreover, the magnetizable particles can be used with non-magnetized media, e.g. regular dyes, paints, etc., by forming a pattern of such particles in a template having a very thin, flexible surface layer so that, when the material on which a design is to be created is held against such layer, the magnetizable particles form a topographical pattern on the thin layer surface for such purpose.

Other techniques for forming surface characteristics of the template substrate may also be devised by those in the art for use in the process of the invention and the above discussion of FIGS. 5–10 is intended to be exemplary thereof.

Figure 12:
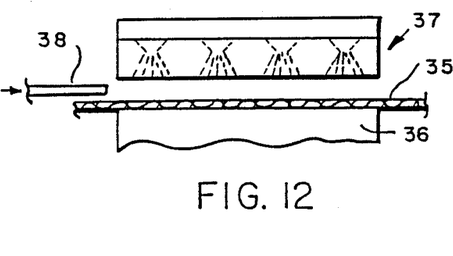
FIG. 12 shows a diagrammatic view of an alternative embodiment for practicing the process of the invention depicted in one stage of the process thereof.
Figure 13:
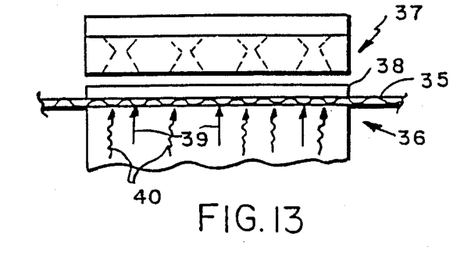
FIG. 13 shows the embodiment of FIG. 12 depicted at another stage of its process.

An alternative embodiment of the process of the invention is illustrated in FIGS. 12 and 13 wherein a medium is applied to the material substrate on which a pattern is to be formed prior to its being placed adjacent a template. As shown in FIG. 12, for example, a material 35 is placed on a suitable mounting structure 36 during an initial stage of operation and a medium is appropriately applied to the material via a suitable media application means 37 as discussed above. No template substrate 38 is present between the media application means and the material 35 or between the material and mounting structure 36 at such stage.

A template 38 can then be moved into position against the surface of material 35, an appropriate force (e.g. using a mechanical or fluid pressure techniques) being applied to the opposite side of material 35 as depicted by arrows 39 for holding the material against the substrate 38, as shown in FIG. 13. The surface characteristics of the template 38, as before, interact with the material 35 containing the medium which has been applied thereto so as to form a desired design pattern on the surface of the material which is adjacent the substrate. Appropriate drying may be achieved, as before, either by applying heated or unheated air (depicted by arrows 40) or by permitting the material to dry naturally. The material can then be removed from the template by moving the template out of its position away from the material and then removing the material from mounting structure 36.

As discussed above, the material utilized in the process of the invention can be selected from any materials on which a suitable design pattern effect can be obtained, such as textiles, fabrics (synthetic and natural), paper, leather and the like. Moreover, the medium utilized may be either in a wet form, such as an ink, a paint, a dye, etc., or it may be in a dry form, i.e., in a powder or other particulate form. The consistency of the medium may be as thick or as thin as desired and may be applied in a pressurized manner as by using a high pressure atomizer or a jet stream applicator or by using low pressure spray at any desired pressure. Alternatively it can be applied in a non-pressurized manner such as by merely letting the medium drip on to the surface of the material under gravity.

The template may be formed of a rigid material or it may be formed as a semi-rigid or flexible material and may be made of a suitable plastic, metal, wood, paper, or other suitable material.

As discussed above the surface characteristics of the template may be in the form of topographical characteristics or non-topographical characteristics. The template itself may have a thickness of any desired value, different effects being achieved depending on the selected thickness as well as on the selected topographical or non-topographical surface characteristics thereof.

The material may be held against the template for a selected time period and at a selected pressure, which characteristics can be selected over relatively wide ranges depending upon the design effects which are desired to be achieved. In some cases, as mentioned above, the mere weight of the material itself may be sufficient to provide the desired pressure.

As mentioned above, drying may be achieved either naturally by merely utilizing naturally circulating air currents as at room temperature or by using an external air circulator source to apply heated or unheated air, or other gas, to the material so as to dry it more quickly.

Further, the medium can also be applied during the time at which the material is being positioned adjacent the surface of the template, as, for example, by using the template as the medium applying means.

In order to further improve the use of the above-described technique of the invention, it is desirable to be able to control the process in a manner such that selected critical parameters are effectively controlled to within appropriately specified parameter ranges so as to control the interactions which occur among the material substrate, the template, and the medium, or media, used in order to obtain the most impressive design patterns, particularly in a controlled production processing environment. Moreover, such "retro-relief" process of the invention can be further controlled so as to change a design pattern at will during the process so that relatively large and continuously variable patterns can be generated.

It is helpful in this connection to understand the interaction phenomenon that occurs when producing the design pattern involved. It has been determined that the interaction, which occurs among the material substrate, the template, and the medium, results from the adhesion and cohesion forces that are produced among such elements during the process. Further, the process can be contrasted with conventional printing processes in that there is no desire to reproduce a specific pattern which may be present on a template, or image-carrier, for example, as in normal printing techniques. Thus, the process of the invention does not provide an exact reproduction of a template design pattern, but rather generates a new design pattern, different from the template pattern, using a combination of adhesive and cohesive forces which occur among the material substrate, template and medium. The differences between the design pattern on the material substrate and the template pattern may range from relatively minimal differences to extremely large differences, or departures, from the template pattern. Further, such design pattern generation is obtained in a controlled fashion such that parameters of major importance are selectively controlled to generate the kinds of patterns desired.

As used herein, adhesion forces can be understood as meaning those forces of attraction between contacting elements, or surfaces of such elements, which elements are of unlike substances. Adhesion is due to the intermolecular forces which arise as a result of the nature of the materials, as well as the temperature and pressure between the elements or surfaces thereof. Cohesion forces can be understood to mean the tendency of different parts of a particular substance to hold together due to forces which are activated between the molecules thereof. Insofar as can be determined, the interaction operation which generates design patterns in accordance with the invention is produced by a combination of both such adhesion and cohesion forces, the first tending to cause attraction between the molecules of the contacting elements and the second tending to cause a particular contacting element to retain its own molecules. All three elements, i.e., the substrate, the template and the medium, interact with each other by effectively transferring lines of such forces among each other, which transfers procedure stresses and pressures within the element so as to result in the generation of original, unique patterns on the substrate which patterns differ from the pattern characteristics of either the template or the substrate. Such forces are effectively controlled by selecting the important parameters utilized in the process, as discussed below.

Generally, the important parameters which are controlled in the process of the invention involve the amount of medium used per unit area, the viscosity of the medium, and the pressure between the material substrate on which the design pattern is to be generated and the template which is used to provide some measure of relief. The relief characteristics of the design patterns desired can be generally categorized as being either a heavy relief pattern or a light relief, or micro-relief, pattern, and as being further characterized in terms of the permeability or non-permeability of the material substrate on which the design pattern is to be created. Thus, in accordance with the process of the invention the above parameters are selected in accordance with such relief/permeability characteristics as set forth below.

Figure 14:
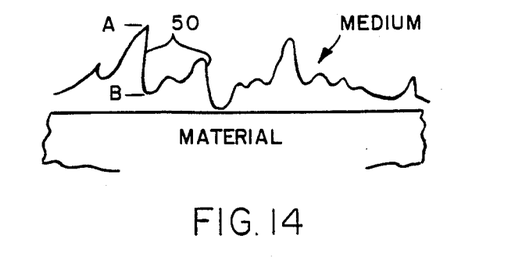
FIG. 14 shows a diagrammatic side view of a portion of an exemplary topographical relief pattern in accordance with the invention.

In accordance with the relief characteristics, the term "heavy relief" can be understood in connection with FIG. 14 wherein it can be seen that the topographical relief pattern thereof is in effect a plurality of peaked ridges 50, the depth of each ridge being determined from crest to trough as, for example, from point A at a crest to point B at an adjacent trough. A heavy relief pattern can be understood to mean one which includes ridges wherein the distance from A to B is greater than about 0.03 inches. While theoretically in some ridges such distance can be much larger, normally to achieve the most desirable patterns it is preferable that such distance in substantially all the ridges of the pattern be less than about 0.15 inches.

A light relief pattern can be understood to mean one in which in substantially all ridges the distance from A to B is less than about 0.030 inches, and preferably is less than about 0.020 inches.

Permeable materials can be understood to mean materials which admit the passage of a liquid or a gas through pores and intersterstices within the material. Examples of such materials are polymer fabrics, such as polyester, polypropylene and nylon fabrics, as well as natural fabrics, such as linens and other fibrous materials. A non-permeable material can be understood to mean materials which are substantially impervious to the admission of the passage of liquid or gas therethrough. Examples thereof are metal, hard plastic materials, coated or sealed wood materials, sealed cement materials, and the like.

The parameters involved in each of the relief/permeability categories discussed above are set forth in the Tables IA, IB, IIA, and IIB below. In each of the tables the parameters set forth therein are generally applicable in processes of the invention which use either rigid, semi-rigid, or non-rigid template materials having topographical or non-topographical surfaces.

TABLE IA

| HEAVY RELIEF PATTERN | | PERMEABLE MATERIAL | |
|---|---|---|---|
| Exemplary Media | Viscosity of Medium (cp) | Amount of Medium (oz/ft$^2$) | Pressure (oz/ft$^2$) |
| Silkscreen Paints, Ink | 78000–700 (General) | 16–2 (General) | 24–1 (General) |
| | 10500–5500 (Preferred) | 6–4 (Preferred) | 8–3 (Preferred) |
| Latex, Water-Based Paints | 50000–300 (General) | 16–2 (General) | 24–1 (General) |
| | 2000–750 (Preferred) | 6–4 (Preferred) | 8–3 (Preferred) |
| Water- | 500–20 | 16–2 | 24–1 |

TABLE IA-continued

| HEAVY RELIEF PATTERN | | PERMEABLE MATERIAL | |
|---|---|---|---|
| Exemplary Media | Viscosity of Medium (cp) | Amount of Medium (oz/ft²) | Pressure (oz/ft²) |
| Based Inks | (General) 200–140 (Preferred) | (General) 6–4 (Preferred) | (General) 8–3 (Preferred) |

TABLE IB

| HEAVY RELIEF PATTERN | | NON-PERMEABLE MATERIAL | |
|---|---|---|---|
| Exemplary Media | Viscosity of Medium (cp) | Amount of Medium (oz/ft²) | Pressure (oz/ft²) |
| Silkscreen Paints, Ink | 76000–600 (General) 9000–4500 (Preferred) | 12–1 (General) 4–2 (Preferred) | 32–3 (General) 16–6 (Preferred) |
| Latex, Water-Based Paints | 47000–200 (General) 1500–500 (Preferred) | 12–1 (General) 4–2 (Preferred) | 32–3 (General) 16–6 (Preferred) |
| Water-Based Inks | 400–40 (General) 150–100 (Preferred) | 12–1 (General) 4–2 (Preferred) | 32–3 (General) 16–6 (Preferred) |

TABLE IIA

| LIGHT RELIEF PATTERN | | PERMEABLE MATERIAL | |
|---|---|---|---|
| Exemplary Media | Viscosity of Medium (cp) | Amount of Medium (oz/ft²) | Pressure (oz/ft²) |
| Silkscreen Paints, Ink | 9500–400 (General) 5400–600 (Preferred) | 10–1.5 (General) 5–3 (Preferred) | 10–0.5 (General) 3–1.5 (Preferred) |
| Latex, Water-Based Paints | 500–100 (General) 400–200 (Preferred) | 10–1.5 (General) 5–3 (Preferred) | 10–0.5 (General) 3–1.5 (Preferred) |
| Water-Based Inks | 30–5 (General) 20–10 (Preferred) | 10–1.5 (General) 5–3 (Preferred) | 10–0.5 (General) 3–1.5 (Preferred) |

TABLE IIB

| LIGHT RELIEF PATTERN | | NON-PERMEABLE MATERIAL | |
|---|---|---|---|
| Exemplary Media | Viscosity of Medium (cp) | Amount of Medium (oz/ft²) | Pressure (oz/ft²) |
| Silkscreen Paints, Ink | 6000–400 (General) 5000–575 (Preferred) | 8–0.75 (General) 3.5–2 (Preferred) | 20–2 (General) 6–3.5 (Preferred) |
| Latex, Water-Based Paints | 500–90 (General) 300–150 (Preferred) | 8–0.75 (General) 3.5–2 (Preferred) | 20–2 (General) 6–3.5 (Preferred) |
| Water-Based Inks | 20–2.5 (General) 15–5 (Preferred) | 8–0.75 (General) 3.5–2 (Preferred) | 20–2 (General) 6–3.5 (Preferred) |

It has been found through experimentation that the viscosity, amount, and pressure parameters as set forth in the above tables should be controlled to lie within the ranges specified in order to provide the most effective and impressive design patterns in accordance with the invention. In such experimentation the measurements of relief dimensions were made by appropriate vernier micrometers. Measurements of the visocity were made using a Brookfield synchro-electric viscometer, such measurements being in centipoises (cp).

In all cases, the material must be dried, such drying being done in various ways, either by utilizing natural air drying techniques (wherein the drying times may run several hours), or by using external heat drying techniques wherein the length of time required is reduced considerably and may run from minutes to only a few seconds.

For example, natural air drying has been found to run from 3–6 hours depending on the characteristics of the media being used. For external heat sources, such as a dry heat of the type often used in transfer printing processes or such as steam heat (either saturated steam at 212°–220° F. or super-saturated steam at 280°–285° F.), the drying times have been found to run from about 1.8–2.25 minutes to about 3.6–4.5 minutes.

It should be recognized that, with respect to permeable materials, for example, while greater amounts of medium are used, generally lower pressures can be used. In many cases, the pressure may merely be that imposed by the weight of the material itself when it is placed in contact with the template and the medium without the use of any additional externally applied pressure. In the drying process it should be understood that, in order to obtain different surface effects on the material, the dryring process can be interrupted and the material, which is then partially dried, can have further medium applied thereto and the drying process continued thereafter.

Figure 15A:
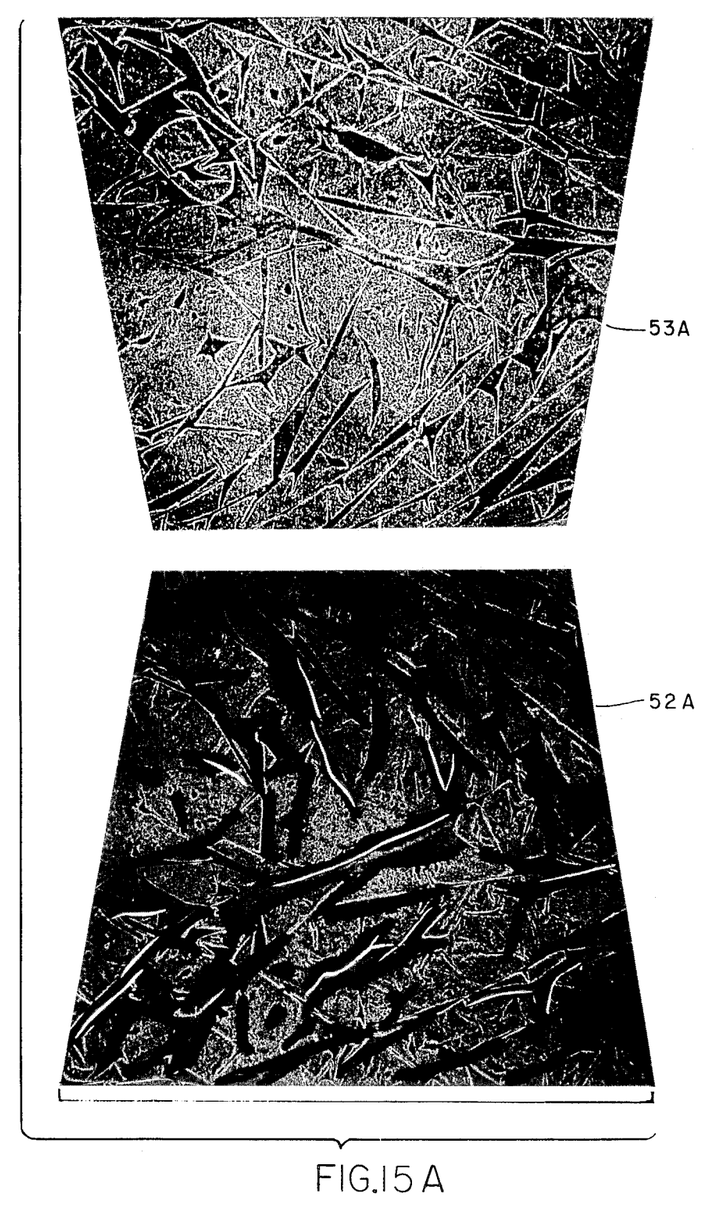
FIGS. 15A and 15B show pictorial plan views of examples of heavy relief patterns in accordance with the invention.
Figure 15B:
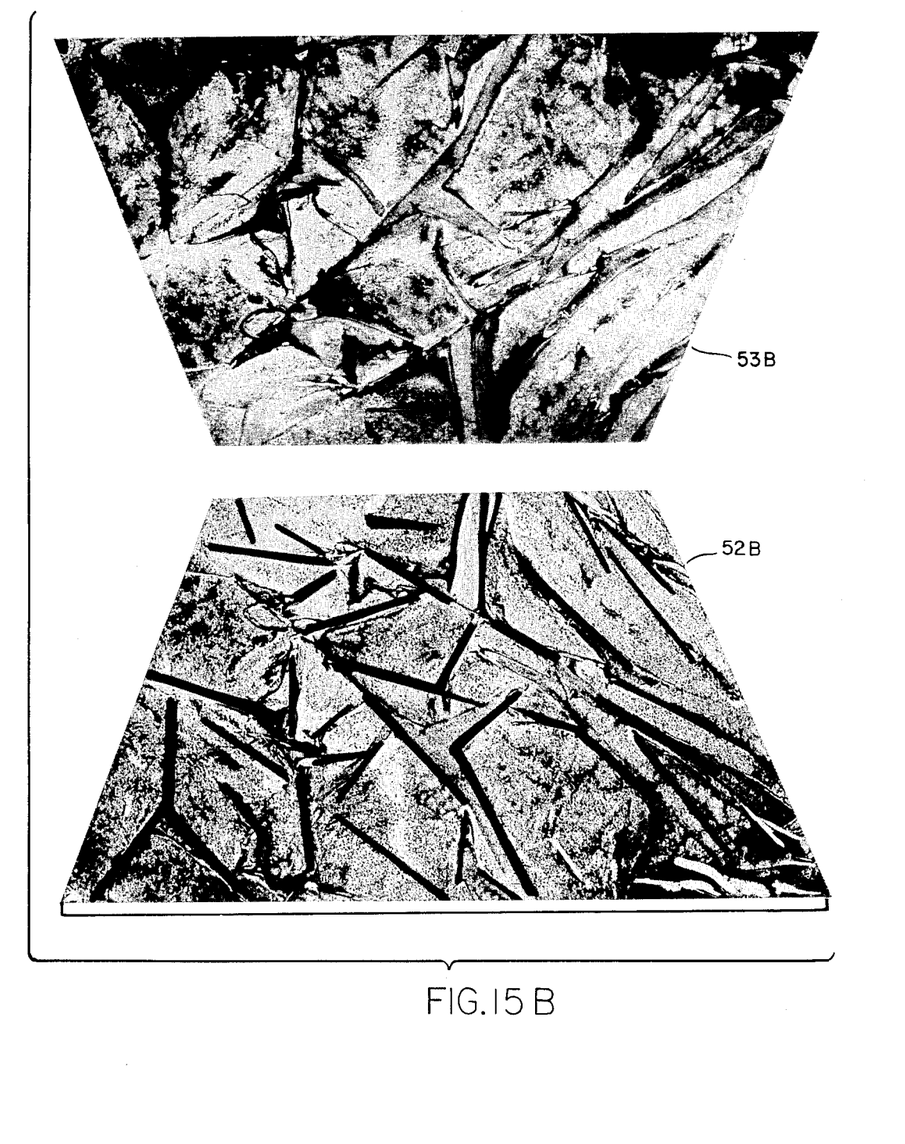

An example of a pattern produced using a material substrate for achieving heavy relief is shown in FIG. 15A wherein a template 52A is shown as having a surface relief pattern depicted in a plan view, the surface relief thickness ranging from 0.02 inches to 0.15 inches. The material substrate 53A is a permeable material to which a water-base paint medium has been applied, the amount thereof being approximately 6 oz./ft² and the pressure applied being 5 ozs/ft2, the medium having a viscosity at room temperature of about 1200 cp (as is known, viscosity generally varies inversely as a function of temperature). It can be seen that the pattern on the material substrate is different from the pattern on the template. The pattern shown in FIG. 15A is only one example of many different types of patterns either abstract or representational, but is illustrated to show that the process of the invention is used to generate new design patterns, rather than merely to reproduce substantially exactly the design patterns of specific templates. Another exemplary heavy relief pattern using a template 52B and a material substrate 53B is shown in FIG. 15B.

Figure 16A:
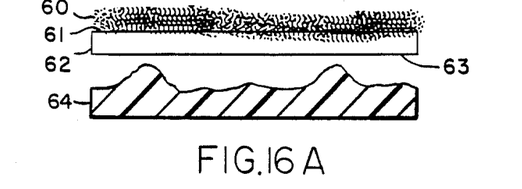
FIGS. 16A, 16B, 16C, and 16D show diagrammatic side views of an exemplary sequence of operations for forming a relief pattern in accordance with the invention.
Figure 16B:
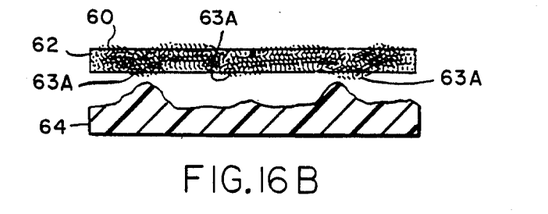

FIGS. 16A, 16B, 16C, 16D depict in sequence an exemplary embodiment of the process of the invention and is helpful in understanding the process of the invention. In the embodiment shown, FIG. 16A shows a medium 60 applied to a surface 61 of a permeable material substrate 62. The oppositely disposed surface 63 thereof will ultimately be used to come into direct contact with a topographical surface of a template 64. FIG. 16B shows that portions of the medium 60 permeate through material substrate 62 to various regions 63A of surface 63.

Figure 16C:
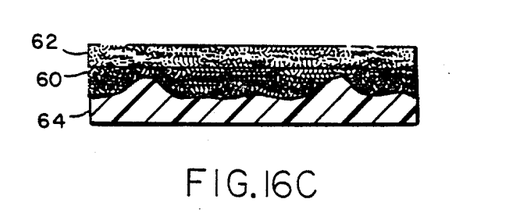
Figure 16D:
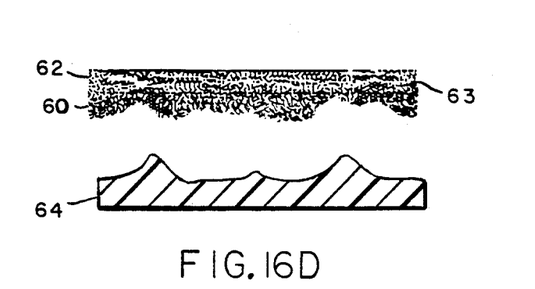

In FIG. 16C, the material substrate surface 63, together with the medium at such surface, is brought into direct contact with the surface of template 64 at a selected pressure. It is at this stage that the adhesion and cohesion forces associated with the material substrate, medium, and templated produce the interactions, as discussed above. When the material substrate is romoved from the template, as shown in FIG. 16D, the medium 60 remaining on the substrate 62 creates a unique design pattern which on surface 63 thereof, which pattern differs from the pattern on the surface of template 64. The design pattern which is so created on surface 63 on the permeable material substrate depends on the amount and viscosity of the medium and the pressure which is used, all of which controllably affect the interaction forces which arises among the substrate, the medium, and the template.

Figure 17:
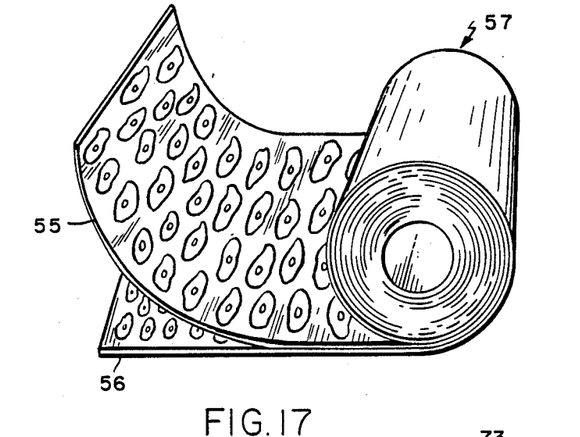
FIG. 17 shows a perspective view of an exemplary relief pattern formed in accordance with an alternative embodiment of the invention.

As a further modification of the process of the invention it may be desirable to produce a design pattern by using the process in a manner such that a variable pressure is used. One approach for creating such a variable pressure is shown with reference to FIG. 17 wherein a medium is placed on a material substrate 55 which is brought into contact with a template 56 and the design pattern generation process is achieved by rolling the continuous material substrate and template elements into a cylindrical roll 57 as shown. As the roll diameter increases, the pressure between the material and template also increases. Once the completed roll is formed it can remain in its rolled-up configuration to dry either naturally at room temperature or by using an external heat source, such as superheated steam at 280°-285° F. , for example. The dried material and template can then be unrolled and separated. The design pattern characteristics which are thereby generated on the material vary as the pressure has been varied during the rolling process. In such a process, for example, the medium can be applied to the surface of the material substrate which is placed in direct contact with the template surface, or, if the material is a permeable substrate, it can be applied to the surface that is out of contact with the template surface and permitted to permeate therethrough at least at selected regions of the material substrate in order to form the final design pattern.

An important application of the process of the invention, apart from creation unique and striking design patterns for aesthestic purposes for use, for example, in the paper, textile, or other fabric industries, lies in the field of security identification devices. Identification (ID) cards of some nature are often used to permit entry to an office, a manufacture plant or other building, or a geographical area, or to permit access to a machine, such as an automatic teller machine, or the like, only to specified persons who must be correctly identified before such entry or access is allowed. Such ID cards may include, for example, a photograph and/or a signature of the person in question, or a magnetic or optical code marking thereon. Since it is possible to reproduce such card formats and to forge the signature, or somehow to produce the same or a similar photograph or code for use thereon, the use of such security ID devices sometime becomes questionable where an uncertainty exists as to whether the card has been legitimately issued to the person who is attempting to use it. It is desirable that such cards be further identifiable by using an appropriate unique and non-reproducible characteristic associated with the card itself, apart from any information supplied as to the person to whom it was issued. The process of the invention lends itself to creation such unique or non-reproducible identifiable characteristics.

As was seen above, the process of the invention creates a unique and non-reproducible design pattern on the surface of a material substrate, which in this case is such an ID card. The design pattern can be readily varied from card to card by varying one of the parameters discussed above even though such variations being capable of ranging from minimal variations to extreme variations from card to card. With each variation, minor or major, a unique pattern is generated on each particular card's surface.

The unique topographical, color, or line characteristics of the pattern can be suitably determined or detected immediately by scanning devices such as a stereolithography apparatus, or the like, for example, and computerized information, e.g. digital data information, concerning such unique characteristics and produced by such detection process, can be stored in a suitable atorage device (e.g. a data base memory) together, in each case, with further data information identifying the person corresponding to the specific card whose particular design characteristics information is being so stored. Suitable scanning techniques can be used to detect the unique design pattern information, as discussed further below.

When a person uses such a card as identification for entry or access, as desired, data concerning the design pattern characteristics on the card are detected and such data are compared to the data previously stored in the data base memory for the person to whom the card was issued. If the data are the same, the security system can provide an indication then assume that the card originally ussud to the person in question is the same card that is being currently used for identification. The uniqueness of the original design pattern is such that the fabrication of a duplicate card baring the same design pattern is essentially not possible.

Figure 18A:
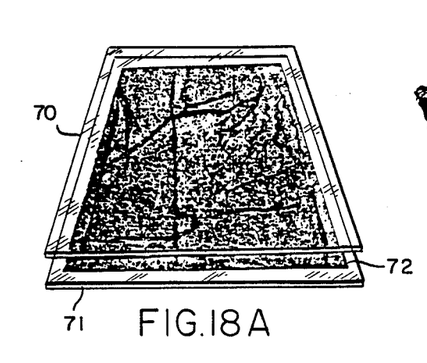
FIG. 18A shows a perspective view of a portion of an exploded view of a card having a relief pattern formed therein in accordance with the invention.
Figure 18B:
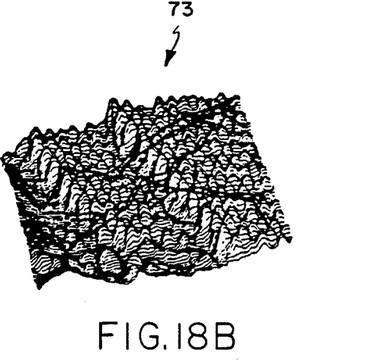
FIG. 18B shows an exemplary topographical relief pattern which can be formed on a card as shown in FIG. 18A.

FIG. 18A shows an exploded view of a portion of an ID card which comprises separate layers 70 and 71, each of a clear plastic laminate material, between which is sealed a substrate 72 having a unique pattern on its surface as generated in accordance with the invention. An exemplary topographical pattern is depicted in FIG. 18B wherein the pattern 73 comprises a unique pattern of peeks and valleys of the medium used to form what can be termed a retro-relief pattern.

A suitable exemplary scanning device, such as a stereolithography apparatus as made and sold by 3-D Systems of Sylmar, Calif. under the model designation SLA 1, can be used to scan the surface of substrate 72 and to produce digital information concerning the height at each of a plurality of scanned points thereof. Such digital information can be suitably stored in a digital memory storage device, the stored information, in effect, representing a digitized "image" of the unique pattern which has been created on the surface of substrate 72. Such an image can be suitably identified as being associated with the particular on which it is used (e.g. identified by the same of the person to whom the card was issued, by a particular code representing such person, or some other identifiable information concerning the card and/or the person to whom it has been issued).

When the card is presented for a security check or clearance, the unique pattern on the surface of the substrate is again scanned to produce a digital representation thereof. Such digital representation can then be compared with the digital information previously stored and identified as associated with the card itself. If a match occurs, since the pattern is a unique, one-of-a-kind pattern, the security system is then assured that the card being checked is the originally issued card and not an unauthorized copy or forgery thereof.

The pattern need not be generated over the entire card, but can be placed only on a small region of the overall card, the dimensions thereof ranging from only a few centimeters to several inches, if desired. Other information can be imprinted on the substrate or the laminate layers without interfering with the unique pattern which has been generated. Further, suitable anti-delamination techniques, well-known in the art, can be used to prevent tampering with the generated image pattern to assure that the pattern has not been altered in any way since the original pattern was created.

Moreover, while the pattern as described above is depicted as being characterized by its topographical characterists, other characteristics of the pattern may also be used to identify the pattern. For example, if a luminous paint medium is used, a unique pattern of luminosity can be created and suitable luminosity scanning detection techniques, known to the art, can be used to store digital information concerning the luminosity of each of a plurality of scanned points thereof.

What is claimed is:

1. A process for producing a design pattern in a material comprising the steps of
    applying an amount of a selected medium to selected portions of an exposed surface of a material in which said design is to be produced;
    positioning said material adjacent a surface of a template having selected surface characteristics either before, during, or after said medium has been applied to said material;
    holding said material against said template surface at a selected pressure provided either by the weight of said material or by an externally applied controllable pressure and for a selected time period, at least a portion of said medium and said material being permitted to come into contact with said template surface, adhesion and cohesion forces of said material, said medium and said template interacting with each other so as to generate a unique design relief pattern on the surface of said material, which pattern differs from the surface pattern characteristics of said template; and
    drying the material having said design pattern generated on the surface thereof.

2. A process in accordance with claim 1 wherein said medium has a viscosity and said material has a permeability and the interactions of said adhesion and cohesion forces are controlled in accordance with the amount and the viscosity of the medium which is used, the permeability of the material on which a relief pattern is to be generated, and the selected pressure so as to generate a design relief pattern having a specified relief characteristic.

3. A process in accordance with claim 2 wherein said specified relief characteristic is a heavy relief pattern to be generated on the surface of a permeable material, said medium having a viscosity within a range from about 78000 to about 700 centipoises, the amount of said medium being within a range from about 16 to about 2 oz./ft.$^2$ and said pressure being within a range from about 24 to about 1 oz./ft.$^2$.

4. A process in accordance with claim 3 wherein said viscosity is within a range from about 10500 to about 5500 centipoises, the amount of said medium is within a range from about 6 to about 4 oz./ft.$^2$, and said pressure is in a range from about 8 to about 3 oz./ft.$^2$.

5. A process in accordace with claim 3 wherein said viscosity is within a range from about 50000 to about 300 centipoises, the amount of said medium is within a range from about 16 to about 2 oz./ft.$^2$, and said pressure is in a range from about 24 to about 1 oz./ft.$^2$.

6. A process in accordance with claim 2 wherein said viscosity is within a range from about 2000 to about 750 centipoises, the amount of said medium is within a range from about 6 to about 4 oz./ft.$^2$, and said pressure is in a range from about 8 to about 3 oz./ft.$^2$.

7. A process in accordance with claim 3 wherein said viscosity is within a range from about 500 to about 20 centipoises, the amount of said medium is within a range from about 16 to about 2 oz./ft.$^2$, and said pressure is in a range from about 24 to about 1 oz./ft.$^2$.

8. A process in accordance with claim 7 wherein said viscosity is within a range from about 200 to about 140 centipoises, the amount of said medium is within a range from about 6 to about 4 oz./ft.$^2$, and said pressure is in a range from about 8 to about 3 oz./ft.$^2$.

9. A process in accordance with claim 2 wherein said specified refief characteristic is a heavy relief pattern to be generated on the surface of a non-permeable material, said medium having a viscosity within a range from about 76000 to about 600 centipoises, the amount of said medium being within a range from about 12 to about 1 oz./ft.$^2$, and said pressure being within a range from about 32 to about 3 oz./ft.$^2$.

10. A precess in accordance with claim 9 wherein said viscosity is within a range from about 9000 to about 4500 centipoises, the amount of said medium is within a range from about 4 to about 2 oz./ft.$^2$, and said pressure is in a range from about 16 to about 6 oz./ft.$^2$.

11. A process in accordance with claim 9 wherein said viscosity is within a range from about 47000 to about 200 centipoises, the amount of said medium is within a range from about 12 to about 1 oz./ft.$^2$, and said pressure is in a range from about 32 to about 3 oz./ft.$^2$.

12. A process in accordance with claim 11 wherein said viscosity is within a range from about 1500 to about 500 centipoises, the amount of said medium is within a range from about 4 to about 2 oz./ft.$^2$, and said pressure is in a range from about 16 to about 6 oz./ft.$^2$.

13. A process in accordance with claim 9 wherein said viscosity is within a range from about 400 to about 40 centipoises, the amount of said medium is within a range from about 12 to about 1 oz./ft.$^2$, and said pressure is in a range from about 32 to about 3 oz./ft.$^2$.

14. A process in accordance with claim 3 wherein said viscosity is within a range form about 150 to about 100 centipoises, the amount of said medium is within a range from about 4 to about 12 oz./ft.$^2$, and said pressure is in a range from about 16 to about 6 oz./ft.$^2$.

15. A process in accordance with claim 2 wherein said specified relief characteristic is a light relief pattern to be generated on the surface of a permeable material, said medium having a viscosity within a range from about 9500 to about 400 centipoises, the amount of said medium being within a range from about 10 to about 1.5 oz./ft.$^2$, and said pressure being within a range from about 10 about 0.5 oz./ft.$^2$.

16. A process in accordance with claim 15 wherein said viscosity is within a range from about 5400 to about 600 centipoises, the amount of said medium is within a range from about 5 to about 3 oz./ft.$^2$, and said pressure being within a range from about 3 to about 1.5 oz./ft.$^2$.

17. A process in accordance with claim 15 wherein said viscosity is within a range from about 500 to about 100 centipoises, the amount of said medium is within a range from about 10 to about 1.5 oz./ft.$^2$, and said pressure being within a range from about 10 to about 0.5 oz./ft.$^2$.

18. A process in accordance with claim 17 wherein said viscosity is within a range from about 400 to about 200 centipoises, the amount of said medium is within a range from about 5 to about 3 oz./ft/$^2$, and said pressure being within a range from about 3 about 1.5 oz./ft.$^2$.

19. A process in accordance with claim 15 wherein said viscosity is within a range from about 30 to about 5 centipoises, the amount of said medium is within a range from about 10 to about 1.5 oz./ft., and said pressure being within a range from about 10 to about 0.5 oz./ft.$^2$.

20. A process in accordance with claim 19 wherein said viscosity is within a range from about 20 to 10 centipoises, the amount of said medium is within a range from about 5 to about 3 oz./ft.$^2$, and said pressure being within a range from about 3 to about 1.5 oz./ft.$^2$.

21. A process in accordance with claim 2 wherein said specified relief characteristic is a light relief pattern to be generated on the surface of a non-permeable material wherein said viscosity is within a range from about 600 to about 400 centipoises, the amount of said medium is within a range from about 8 to about 0.75 oz./ft.$^2$, and said pressure being within a range from about 20 to about 2 oz./ft.$^2$.

22. A process in accordance with claim 21 wherein said viscosity is within a range from about 5000 to about 575 centipoises, the amount of said medium is within a range from from about 3.5 to about 2 oz./ft.$^2$, and said pressure is in a range from about 6 to about 3.5 oz./ft.

23. A process in accordance with claim 21 wherein said viscosity is within a range from about 500 to about 90 centipoises, the amount of said medium is within a range from about 8 to about 0.75 oz./ft.$^2$, and said pressure is in a range from about 20 to about 2 oz./ft.$^2$.

24. A process in accordance with claim 23 wherein said viscosity is within a range from about 300 to about 150 centipoises, the amount of said medium is within a range from about 3.5 to about 2 oz./ft.$^2$, and said pressure is in a range from about 6 to about 3.5 oz./ft.$^2$.

25. A process in accordance with claim 21 wherein said viscosity is within a range from about 20 to about 2.5 centipoises, the amount of said medium is within a range from about 8 to 0.75 oz./ft.$^2$, and said pressure is in a range from about 20 to about 2 oz./ft.$^2$.

26. A process in accordance with claim 25 wherein said viscosity is within a range from about 15 to about 5 centipoises, the amount of said medium is within a range from about 3.5 to about 2 oz./ft., and said pressure is in a range from about 6 to about 3.5 oz./ft.$^2$.

27. A process in accordance with claim 1 wherein said drying is by the use of natural air drying.

28. A process in accordance with claim 1 wherein said drying is by the use of steam heat.

29. A process in accordance with claim 28 wherein said drying is by the use of supersaturated steam heat.

30. A process in accordance with claim 1 wherein said pressure varies over the course of said process.

31. A process in accordance with claim 1 wherein said template is used to apply said medium to the surface of said material during the selected time period when said material is held against said template surface.

32. A process in accordance with claim 1 and further including the step of sealing said material having said unique design relief pattern between two transparent laminate layers to form at least a portion of a uniquely identifiable card.

33. A process in accordance with claim 32 and further including the steps of
   scanning the uniquely formed relief pattern on the surface of said material when said pattern is formed to provide data representing said relief pattern;
   storing said data in a data storage means;
   subsequently processing a security card having a design relief pattern thereon by scanning the relief pattern thereon to provide subsequent data representing said relief pattern;
   comparing the subsequent data produced by said subsequent precessing with the data previously stored in said data storage means to determine whether said data is the same as said previously stored data.

* * * * *

UNITED STATES PATENT AND TRADEMARK OFFICE
CERTIFICATE OF CORRECTION

PATENT NO. : 4,935,083
DATED : June 19, 1990
INVENTOR(S) : Todd L. Siler

It is certified that error appears in the above-identified patent and that said Letters Patent is hereby corrected as shown below:

On Title Page, please insert Item 73 as follows:

[73] Assignee: Massachusetts Institute of Technology, Cambridge, Mass.

Above item [57] Abstract, insert --Attorney, Agent or Firm-- "Robert F. O'Connell".

In the Abstract:

Line 1, delete the "a" before the word design.

Line 9, "conesive" should be "cohesive".

Signed and Sealed this

Twenty-sixth Day of November, 1991

*Attest:*

HARRY F. MANBECK, JR.

*Attesting Officer*     *Commissioner of Patents and Trademarks*